April 7, 1953 M. R. WOLFARD 2,634,122
FLEXIBLE STRUT
Filed Jan. 3, 1948 4 Sheets-Sheet 1
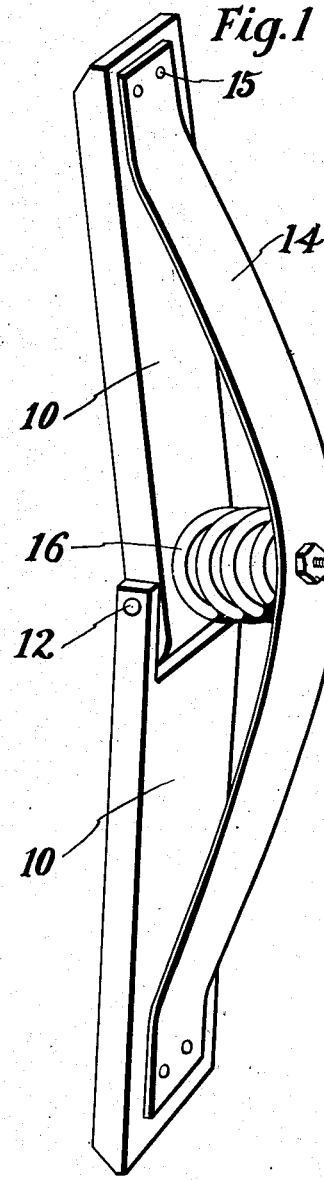
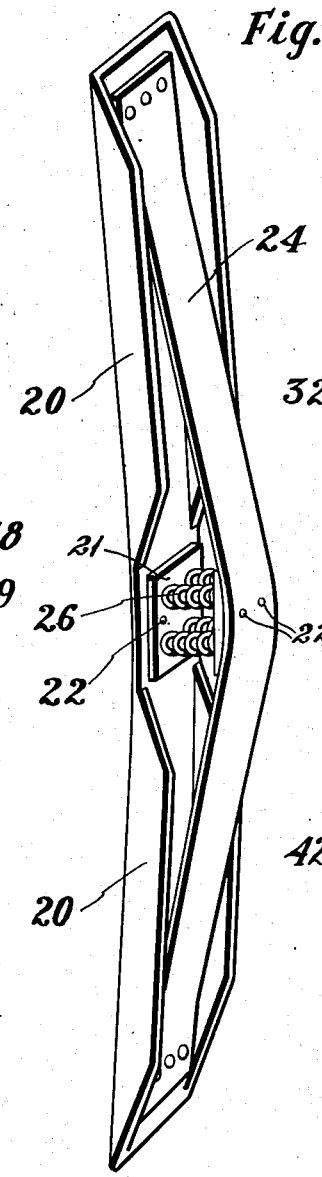
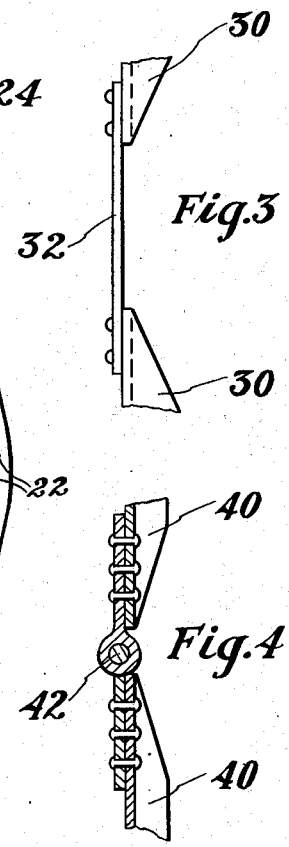
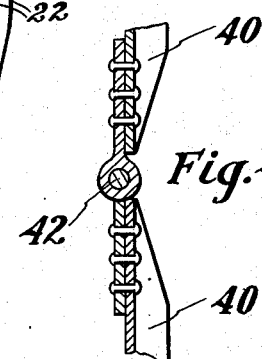
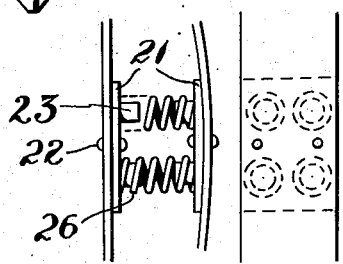
Merl R. Wolfard Inventor
By Everett E. Kent Attorney April 7, 1953 M. R. WOLFARD 2,634,122
FLEXIBLE STRUT
Filed Jan. 3, 1948 4 Sheets-Sheet 2
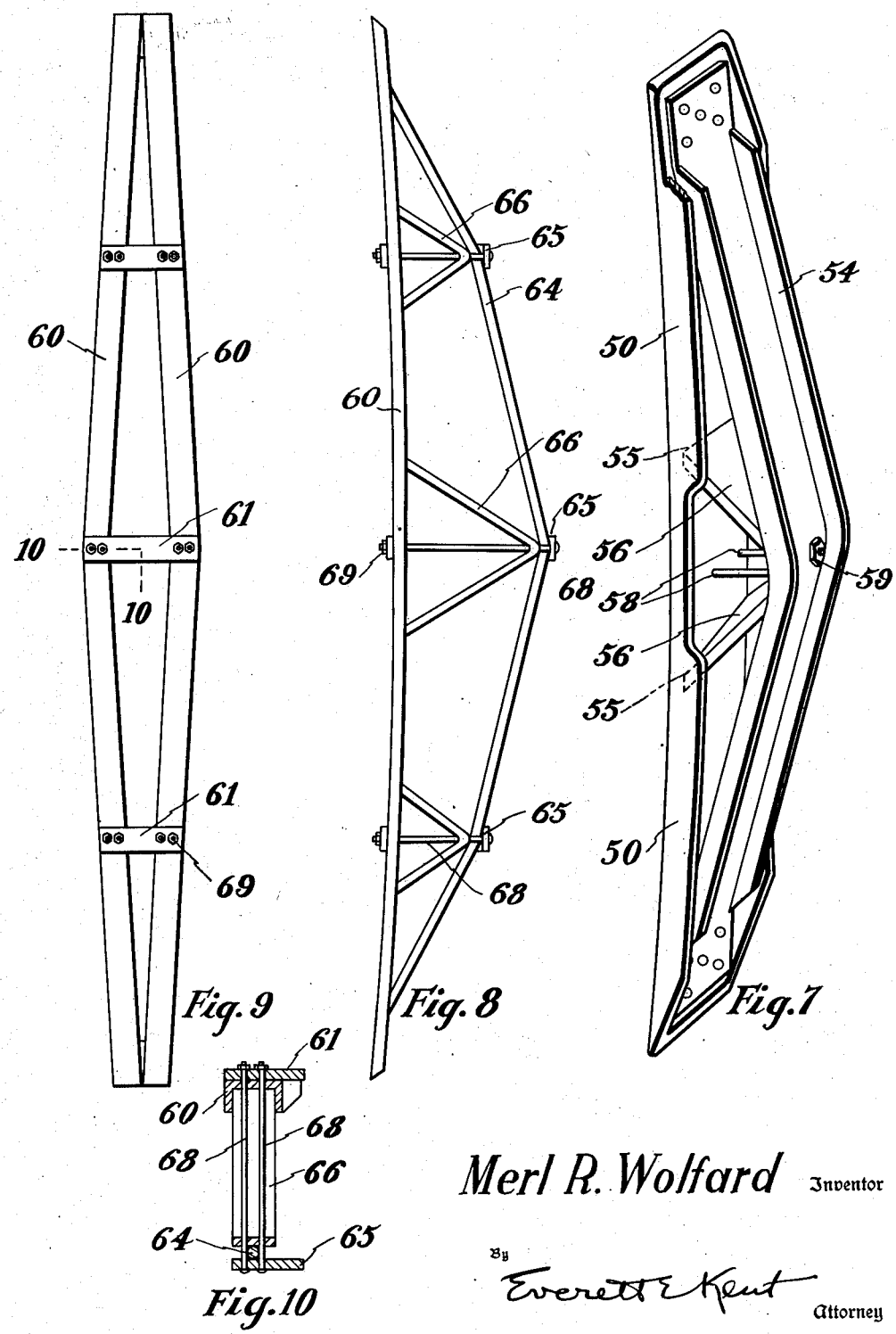
Merl R. Wolfard Inventor
By Everett E. Kent Attorney April 7, 1953   M. R. WOLFARD   2,634,122
FLEXIBLE STRUT Filed Jan. 3, 1948   4 Sheets-Sheet 3

*Merl R. Wolfard*, Inventor

By *Everett E. Kent*, Attorney

April 7, 1953     M. R. WOLFARD     2,634,122
FLEXIBLE STRUT
Filed Jan. 3, 1948     4 Sheets-Sheet 4

Merl R. Wolfard Inventor

By Everett E. Kent Attorney

Patented Apr. 7, 1953

2,634,122

UNITED STATES PATENT OFFICE 2,634,122

FLEXIBLE STRUT

Merl R. Wolfard, Cambridge, Mass.

Application January 3, 1948, Serial No. 418

11 Claims. (Cl. 267—1)

This invention provides a flexible-strut.

More particularly it provides a strut which, throughout a predetermined range of loading, can be bowed or flexed in one direction. This permits the strut to become slightly shorter or longer while supporting its load. Such a change of length is useful for many purposes, particularly for structures that are subject to intermittent loadings which tend to cause undulations in the structure, including suspension bridges, masts and many types of truss structures for supporting bridges, floors and buildings, and particularly for supporting elevated storage tanks or similar structures in wind swept areas and in earthquake zones.

An important field for the use of such a flexible-strut is for holding a tension stay taut. This flexible-strut may be arranged to keep the tension in such a stay approximately constant, irrespective of changes in its length, as by changes in temperature. The flexible-strut may permit the length of a stay to change without any substantial change in the tension of that stay. Or, a flexible-strut may be arranged to sustain a loading at a fixed location throughout a range of increase of loading on that flexible-strut, and then upon reaching a certain predetermined increase of loading will yield to safeguard the structure.

So far as I am aware these characteristics are not found in engineering art heretofore known. As heretofore used struts yield elastically under an increase of loading which causes lengthwise compression. The making of a flexible-strut as provided by the present invention, is to be distinguished from such elastic shortening. The variable length of the strut here being described is the result of a special combination of elements which in themselves have the usual inherent elasticity of structural materials. The arrangement of the elements in the flexible-strut provides a variableness in the length of this flexible-strut which is quite other than the elastic yielding of the ordinary strut in proportion to its loading.

The flexible-strut of the invention comprises a compression element, for resisting endwise loading, and a tension element which is secured thereto and extends lengthwise beside that compression element. In other words, the compression element has a portion of its length offset in one direction from a straight axial line of the strut, which is a straight line extending between the ends of said compression element. The word "offset," as used, signifies "set at a distance from." A region of this offset portion of the compression element is yieldable in the direction of said offset. It follows that the compression element is capable of being deflected in the direction of its offset by increase of loading on the flexible-strut.

The tension element has the major portion of its length offset from the straight reference line referred to hereinabove to an extent greater than the offset of said compression element, but in the same direction. There is spacing means for holding the tension and compression elements apart from each other between the points where the tension element is secured to the compression element. Means is provided for controlling the flexing of the compression element, so that throughout a predetermined increase of pressure a changing of the length of the flexible-strut will occur. This controlling means is such that this change in length may occur all the way over the whole range of operating changes in load on the flexible-strut, or there may be means which can be set so that this change in length begins at a particular selected point in that range. The means for spacing the compression and tension elements apart may be a compression spring. There may be a bolt extending through the compression and tension elements for drawing these elements together against the compression of the spring, for selectively setting the degree of loading beyond which the change in length of the strut will occur.

Another form of spacing means may be a V-strut, in which the arms of the V carry the compression load for holding the compression and tension elements apart, these arms being held in position against the compression element, and the point of the V being pressed against the tension element. In this case there is a tension means extending from the compression element at a location between the ends of the arms of the V to the point of the V, for deflecting the compression element at that location toward the point of the V. The loading beyond which change in the length of the flexible-strut occurs, depends upon the amount of the set deflection of the compression element between the arms of the V when the structure is static.

An illustrative instance of the utility of the flexible-strut of the invention is found in its use for holding tension stays taut for minimizing undulatory movements in a suspension bridge. Such a stay may, at one end, be attached to a main cable of the bridge in an end-region of the main span of the bridge. Or, such a stay may have both ends attached to the cable, the stay extending lengthwise of the cable above it and across the middle of the main span of the bridge. When a flexible-strut is based on a main cable and deflects such a lengthwise stay upward, for initially tensioning that stay, then, upon drop of temperature, the stay becomes shorter, and a rise of the middle of the main cable occurs. This moves the ends of that stay farther apart, and also moves the basal end of the flexible-strut upward. All three of these movements tend to increase the tension in the stay. The shortening of the flexible-strut which the invention provides can be at such a rate as will hold the tension of a stay substantially constant. Or, the means controlling the flexure of the flexible-strut can be set so as to permit an increase in the tension of that stay up to a predetermined loading, and then by yielding can safeguard that stay against overloading.

Another characteristic is that a designer using a flexible-strut knows in advance the direction in which it will yield, if at all; and therefore he does not need to make his design massive enough to resist possible yielding in every lateral direction. The vibratory characteristics of this flexible-strut are also different from those of a strut which is free to vibrate in all lateral directions, and provide greater stability and permit further reduction in weight.

Details of the invention are shown in the accompanying drawings. These are illustrative rather than definitive, and are to an extent diagrammatical.

In the accompanying drawings:

Figure 1 is a perspective view as seen from one side of a flexible-strut embodying the invention, in which the compression element is in two parts pivoted together at the mid-region of the strut;

Figure 2 is a similar perspective of another flexible-strut in which the compression element is integral throughout its length, but with its stiffening cross-sectional area reduced at the mid-region of the strut to that that reduced area can be flexed;

Figure 3 is a side elevation of a portion of another flexible-strut in which the flexible mid-portion of the compression element is an introduced section of spring steel.

Figure 4 is a side elevation, in section, of another flexible-strut showing a hinge introduced at the flexible mid-region of the compression element;

Figures 5 and 6 are elevations of two sides at a right angle to each other, of the mid-region of a flexible-strut such as is indicated in Figure 2, showing the arrangement of a plurality of springs;

Figure 7 is a perspective of a type of flexible-strut in which a V-strut holds apart the main elements of the flexible-strut;

Figure 8 is a side view illustrating a flexible-strut in which the main elements are held apart by a plurality of V-struts;

Figure 9 is a side view illustrating a compression element suitable for use with a plurality of V-struts in Figure 8;

Figure 10 is a sectional view taken on line 10—10 of Figure 9;

Figure 11:
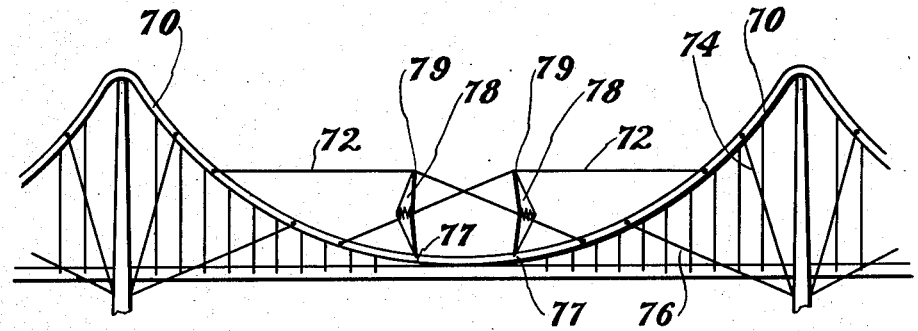
Figure 11 is a side elevation of a suspension bridge in which flexible struts are combined with elements of the bridge for tautening tension stays which extend lengthwise across the middle of the bridge.

In the accompanying drawings, in Figure 1, the compression element 10 is two channel bars pivoted together at a pin 12. The tension element 14 is a flat band, which has its end portions secured to the end portions of the compression element 10 in any convenient manner, as by rivets 15. The mid-region of the tension element is spaced from the mid-region of the compression element by a spring 16. The compression element is offset toward the tension element, and the pivoting of it at the pin 12 permits the compression element to move toward the tension element when an endwise increase of loading on the strut is sufficient to compress the spring 16. Such deflection of the mid-region of the compression element decreases the length of the flexible-strut.

Figure 18:
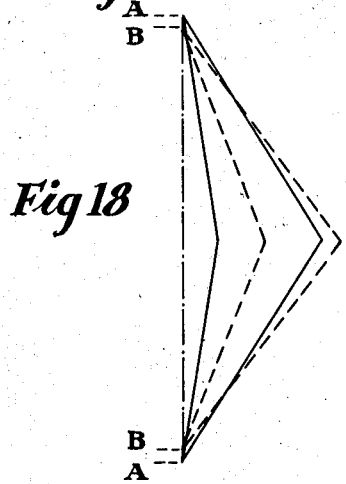
Figure 18 is a diagram showing the relationships of movements of the compression and tension elements of a strut of this invention, with reference to a straight axial line of the strut extending through the ends of the compression element.

Relative movements in such flexible-struts are illustrated diagrammatically in Figure 18 with reference to a straight axial line of the strut extending through the ends of the compression element. The axial line is represented by long and short dashes. The angles of the main elements are exaggerated for clearness. The solid lines represent an initial position of the compression element and of the tension element; the broken lines indicate the relative positions of those same elements after the addition of loadings sufficient to shorten the flexible-strut in the amount indicated by the difference between the initial positions A and the second positions B of the ends of the strut. Changes in length due to ordinary resiliency of the materials in the elements are neglected. That is, the length of each element from its end to its center remains unchanged. The broken lines indicate the new positions of the compression and tension elements. It will be noted that the mid-region of the compression element has moved farther from its initial position than has the mid-region of the tension element. Therefore, when the strut is flexed, a spring holding these regions apart will be compressed or shortened in an amount which is less than the extent of movement of the mid-region of the compression element toward the tension element.

In a simple structure such as illustrated diagrammatically in Fig. 18, any increase of endwise loading tends to deflect the compression element and thus to compress the spring so that the mid-region of the compression element 10 moves toward the mid-region of the tension element 14. The increased compressive load thus applied to the spring is resisted by the tension element, which is deflected somewhat, but less than the deflection of the compression element.

During the loading of the flexible-strut, the rate of change of the length of the flexible-strut depends upon the extent of the initial offset at the mid-region of the compression element, in conjunction with the rate of increase in the resistance of the spring. The initial offset of the compression element, and also of the tension element, and the rate of increase in the resistance of the spring, can be designed so that an expected increase in loading on the flexible-strut will produce a desired shortening of the flexible-strut.

To permit an amount of increase of loading to be applied on the flexible-strut before it begins to flex, there may be a bolt 18 extending through the compression and tension elements, with a nut 19, for drawing those elements toward each other against the compression of the spring 16. The amount of this increase of loading is that which would produce a pressure on the spring equal to that applied by the bolt, when the structure is static.

In Figure 2 the compression element 20 is integral throughout its length and, as represented, is a channel bar with the flanges of the channel removed at the mid-portion to permit flexure there. The tension element 24 is similar to that in Figure 1, the two elements being spaced from each other by a nest of springs 26. On each element there is a plate 21 held in position in any convenient manner as by rivets 22 and having bosses 23 (Fig. 5) engaging the springs to hold them in place. The part of the compression element where the flanges are cut away has sufficient flexibility to permit a yielding of that element toward the tension element.

In Figure 3 the middle portion 32 of a compression element 30 is a separate piece of spring steel having a higher elastic limit than ordinary structural steel. The spring steel will yield safely through a greater range of flexure.

In Figure 4 the yieldability of the compression element 40 is provided by the introduction of a hinge 42.

Figures 5 and 6 are detailed views showing the arrangement of the nest of springs 26 in Figure 2, with a plate 21 having bosses 23 to hold the springs in place.

In Figs. 7–10 are shown other embodiments of the invention, wherein the means for spacing apart the compression and tension elements comprises one or more V-struts, each V-strut having a tension rod across that V.

In Figure 7 the compression element 50 is a channel bar, with a portion of its flanges removed at the mid-region so that it can be flexed there. The tension element 54 is indicated as being also a channel bar with less depth of flanges. This type of structure is especially suitable for struts sustaining heavy loads, and particularly where it is desirable that what the strut supports should be held in approximately constant position throughout a certain range of loading, and then by being permitted to move slightly, this avoids excessive stressing. This type is characterized by having a V-strut, which in this instance is at the mid-portion of the strut, with the ends 55 of the V-arms 56 held in position against the compression element, as by welding or otherwise, and with the point of the V pressing against the tension element. Bolts 58 extend from the compression element 50 between the V-arms 56 to the tension element at the point of the V, and carry nuts 59. When the nuts 59 tension the bolts 58, the mid-portion of the compression element, between the V-arms 58, will be deflected toward the point of the V.

The deflecting of the compression element, where the bolts 58 pass through it, toward the point of the V, tends to move the ends of the compression element in that direction which is away from the tension element; but these ends of the compression element are secured to the tension element and therefore cannot move away from it. The result is a pressure against the tension element at the point of the V. This follows because the ends of the arms of the V-strut act as fulcrums for levers which when depressed at the center of the V tend to move the secured ends of the tension element in that direction which makes that tension element press against the point of the V. In other words, tension in the bolt 58 applies an initial loading to the flexible-strut as a whole.

The V-strut is not necessarily at the mid-region, and there may be more than one V-strut. Figures 8, 9 and 10 show three V-struts in a flexible-strut. The compression element is here marked 60. The tension element 64, consists of two cables. The compression element consists of two channel bars which are spread laterally from each other, as clearly seen in Figure 9 at their mid-portions, with their spread diminishing towards their ends where they are secured to the ends of the tension cables. At the location of each of the three V-struts here shown there is a bar 61 extending laterally from one channel bar to the other to hold those bars in their spaced relation. A similar bar 65 extends from one to the other cable of the tension element at each point of a V. In this illustrative instance the compression element is bowed toward the tension element throughout its length between points where the tension element is secured to it. Between the arms of each V, the deflecting of the compression element toward the point of the V loads the flexible-strut as a whole. Because of the loading initially applied by the bolts 58 or 68 of the one or more V-struts, the flexible-strut as a whole remains of substantially unchanged length during any increase of loading up to the point where the total added loading equals and so removes the tension which was on the bolts 58 or 68.

The structure show in Figures 8, 9 and 10, where cables are used for the tension element provides for a greater extent of yielding, after the yielding begins, than would be possible if solid bars were used in place of the cables 64, because cables will with safety permit of greater elongation under loading.

Figure 12:
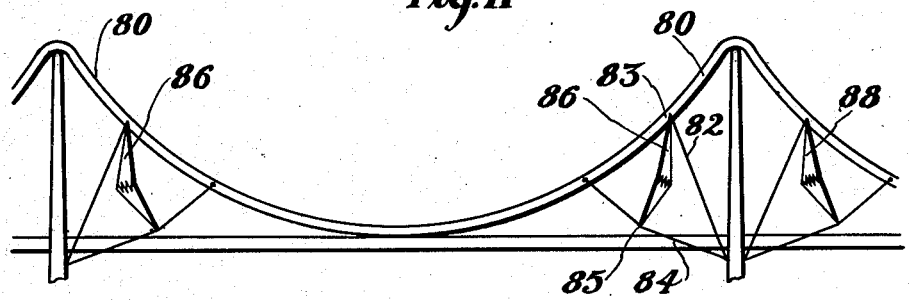
Figure 12 is a side elevation of a suspension bridge in which flexible-struts are combined with inclined tension stays on either side of a tower of the bridge.

The combination of flexible struts with other elements in suspension bridges is shown in Figures 11, 12, where they hold taut tension stays which restrain undulating movements in main cables of the suspension bridge.

In Figure 11 the main cable 70 has two tension stays 72 extending lengthwise of the bridge above the cable, crossing each other at the mid-region of the bridge. Each stay has its upper end secured to the main cable within an end region of that cable, between two tension stays 74, 76 that are inclined downward. Each said lengthwise stay 72 has its other and lower end secured to the main cable 70 at a distance beyond the center but short of the place where the inclined stay 76 at the opposite end of the bridge is secured to that cable 70. For each of these lengthwise tension stays 72 there is a flexible-strut 78 based on the main cable, as at 77, and deflecting upward the lengthwise tension stay 72, as at 79, for controlling the tension of that lengthwise stay 72. This flexible-strut 78 may be like any of the embodiments which are illustrated in Figures 1–10, but is here shown as of the type in which a spring at the mid-portion of the flexible-strut controls the spacing of the compression and tension elements of the flexible-strut so that the tension in the tension element 72 may be maintained substantially constant.

In Figure 12 each end region of the main cable 80 has two inclined tension stays 82, 84; and there is a flexible-strut 86 mounted to press against the main cable 80 at 83, which is at the region where the stay 82 is secured to the cable. The other end of this flexible-strut deflects the inclined stay 84 at the point 85, for controlling the tension in the inclined tension stay 84. The struts 86, 88 are represented as being of the type with springs for controlling spacing between its compression element and tension element, but preferably there is, as shown in Figure 1, a bolt extending through these elements for initially compressing the spring to set a static distance between these elements, so that a considerable increase in loading may occur before the strut begins to flex. There may be a similar arrangement of tension stays and flexible-strut 88 stabilizing the side span of the bridge.

Figure 13:
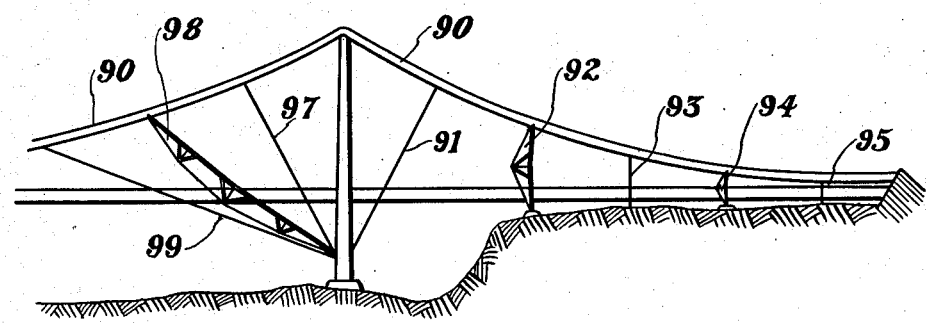
Figure 13 is a side elevation representing a fragment of a bridge and underlying terrain in which flexible-struts are combined with a main cable for deflecting the cable upward between tied-down locations along that cable.

Figure 13 represents the side span and a portion of the main span of a suspension bridge, in which the main cable 90 has two flexible-struts 92, 94 for deflecting that main cable 90 upward, between the points where that cable is tied down by the tension stays 91, 93, 95, when the structure is static. In this case also the flexible-strut may be of any of the illustrated types, but preferably is one that does not yield until after a predetermined increase in loading has occurred beyond its static loading. The type of flexible-strut shown has a V-strut, and tie rod for controlling the spacing between its tension and compression elements.

In that part of the main span which is shown, on the other side of the tower, the flexible-strut 98 is of the type which has three V-struts separating its compression and tension elements, each with its tie rod. This V-strut 98 is inclined downward from the main cable 90 and is based at the tower. From this base of the flexible-strut, tension stays 97, 99 extend at an incline upward to the main cable on opposite sides of the flexible-strut 98, each being attached to the cable at a substantial distance from the flexible-strut.

Figure 14:
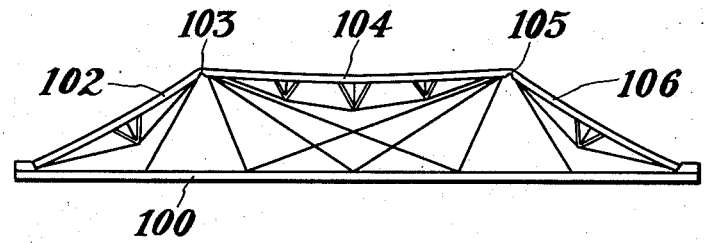
Figure 14 is a side elevation of a bridge truss in which three flexible-struts of the invention are combined to form the main load-sustaining compression element of that truss.

In Figure 14 the principal load sustaining element is a compression element and comprises three flexible-struts, 102, 104 and 106 having junction points 103, 105. The platform 100 of this bridge is sustained by tension hangers which extend to it from these junction points. The three flexible-struts constitute the main compression element of the bridge, and, each being stable within itself, they provide stable junction points 103, 105 from which the platform is hung. That is, there need be no connections from the platform to intermediate locations along an I-beam or any built up box structure to constitute a compression member as is usual in bridges of this type. A main value of using flexible-struts in such cases is not so much the fact that they will flex under normal live loadings as it is that the initial loading applied by the V-struts, under static conditions, makes the junctions 103, 105 be exceptionally stable. However, under extreme conditions, these junction points 103, 105 can yield to guard against a building up of excessive stresses.

Figure 16:
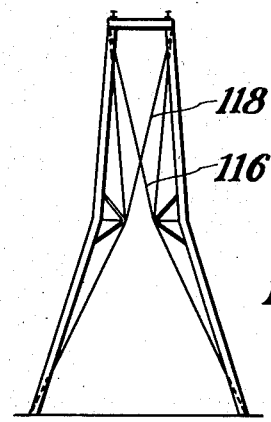
Figure 16 is an end elevation of a railroad trestle in which flexible-struts of the invention support the load.
Figure 15:
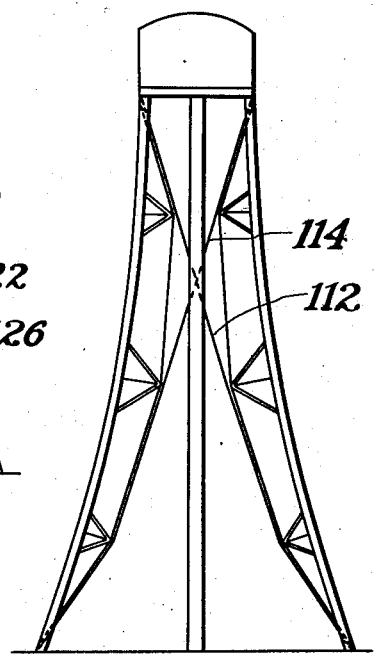
Figure 15 is a side elevation showing flexible-struts supporting an elevated load.

Flexible-struts arranged in pairs with the tension elements facing each other, as in Figures 15 and 16, are good for supporting an elevated load. In Figure 15 there are two pairs, one pair being seen in side elevation and the other pair seen edgewise. These may support a storage tank or other load. Figure 16 indicates an arrangement of flexible-struts for a railroad trestle. In each of the pairs of flexible struts there is a tie extending from the point of a V at the mid-region of the flexible-strut to the top of the flexible-strut which is opposite in the pair. In Figure 15 these are 112, 114; and in Figure 16 they are 116, 118. Each of these ties prevents a rising of the upper corner to which it is attached whenever a side pressure, or a loading, tends to cause rise of that corner.

Figure 17:
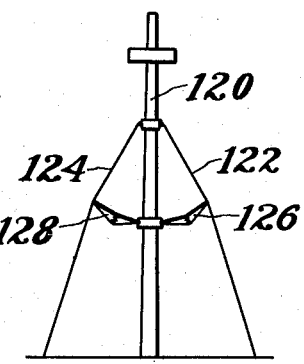
Figure 17 is a side elevation of a mast and its holding structure, in which flexible-struts tauten the holding stays.

In Figure 17 there is a mast 120 which has lateral tension stays extending from the mast to suitable anchorages, one pair only of these being shown, 122, 124. Flexible-struts 126, 128 extend from the mast to these stays, for controlling the tension in these stays.

These various illustrations of the application of flexible-struts typify arrangements to reduce vibratory movements in structures or to safeguard structures against becoming over stressed, or both. I have found that in many types of structure, which particularly include suspension bridges, the structure may with advantage be stabilized against vibratory movements resulting from the incidence of the lighter live loads, and that such structures may be permitted to yield substantially under the incidence of the heavier loads. These latter are not sufficiently repetitive in sequence to build themselves into the larger undulations which may become detrimental. An illustration of a repetitive light loading which can be disturbing, or even destructive, is the influence of winds on a suspension bridge.

I claim as my invention:

1. A flexible strut comprising, in combination, a compression element having a portion of its length offset in one direction from the straight axial line extending between the ends of said compression element; a region of said offset portion of the compression element being yieldable in the direction of said offset; a tension element extending lengthwise of said flexible strut and secured at its ends to said compression element and held against lengthwise slip relative thereto; said tension element having the major portion of its length offset from said axial line to an extent greater than the offset of said compression element and in the same direction; spacing means disposed between the yieldable offset portion of said compression element and said tension element and holding said elements in spaced relation to each other; said tension element and spacing means together constituting controlling means for regulating the deflection of said compression element under changes in loading on the flexible strut in the direction of its length; said controlling means embodying a resiliently yieldable constituent whereby, over a range of loading, increase of loading causes deflection, and decrease of that loading decreases such deflection.

2. A flexible strut as in claim 1, further characterized in that the said yieldable region of the offset portion of the compression element comprises a hinge.

3. A flexible strut as in claim 1, further characterized in that the said yieldable region of the offset portion of the compression element comprises a section which is flexible.

4. A flexible strut as in claim 1 further characterized in that the said spacing means includes a compression spring.

5. A flexible-strut as in claim 4, further characterized in that the said spacing means includes tension means connecting the compression and tension elements and holding those elements against elastic force of said spring, for preloading said spring.

6. A flexible-strut as in claim 1, further characterized in that the said spacing means comprises a V-strut, the arms of which are held in position against the compression element, and the point of which is held in position against the tension element; and tension means cooperating with the compression element between the arms of the V-strut and cooperating with the tension element at the point of the V-strut, and clamping said compression and tension elements against said V-strut.

7. A flexible-strut as in claim 6, further characterized in that the said yieldable region of the offset portion of the compression element extends throughout the major part of the length of said offset portion, and in that there is a plurality of said V-struts arranged in spaced relation to each other longitudinally of said flexible-strut.

8. A flexible-strut as in claim 1, further characterized in that the said tension element comprises a cable.

9. A combination of two flexible-struts, as defined in claim 1, for supporting a load in common, in which the two said flexible-struts are both set in the same plane, with their tension elements facing each other; there being means connecting the upper ends of said flexible-struts and holding those ends at a fixed distance apart; and the basal ends of those flexible-struts being anchored at a fixed distance greater than the distance between the upper ends of said flexible-struts.

10. A combination as in claim 9, further characterized in that there is a plurality of pairs of said flexible struts, the pairs being set in planes which intersect each other at a common center of the said pairs.

11. A combination as in claim 9, further characterized in that for each said flexible-strut there is another tension element connected to a midregion of the tension element of said flexible-strut and extending thence to the top of the opposite flexible-strut of the pair, where it is held against lengthwise slip relative to that opposite flexible-strut.

MERL R. WOLFARD.

REFERENCES CITED

The following references are of record in the file of this patent:

UNITED STATES PATENTS

| Number | Name | Date |
| --- | --- | --- |
| 74,973 | Ayres | Mar. 3, 1868 |
| 1,156,859 | Hamilton | Oct. 12, 1915 |
| 2,035,937 | Anderson | Mar. 31, 1936 |
| 2,053,226 | Ruge | Sept. 1, 1936 |
| 2,457,427 | Wolfard | Dec. 28, 1948 |

FOREIGN PATENTS

| Number | Country | Date |
| --- | --- | --- |
| 472,251 | Great Britain | 1937 |
| 547,783 | Germany | Apr. 1932 |